US012802309B2

(12) United States Patent
Chinnappareddygari

(10) Patent No.: US 12,802,309 B2
(45) Date of Patent: Nov. 17, 2026

(54) AI-BASED VIRTUAL REALITY PLATFORM AND AN OPERATING METHOD THEREOF

(71) Applicant: Sudheer Reddy Chinnappareddygari, Karnataka (IN)

(72) Inventor: Sudheer Reddy Chinnappareddygari, Karnataka (IN)

( * ) Notice: Subject to any disclaimer, the term of this patent is extended or adjusted under 35 U.S.C. 154(b) by 129 days.

(21) Appl. No.: 19/103,315

(22) PCT Filed: Aug. 25, 2023

(86) PCT No.: PCT/IN2023/050802
§ 371 (c)(1),
(2) Date: Feb. 12, 2025

(87) PCT Pub. No.: WO2024/047665
PCT Pub. Date: Mar. 7, 2024

(65) Prior Publication Data

US 2026/0057582 A1 Feb. 26, 2026

(30) Foreign Application Priority Data

Aug. 27, 2022 (IN) ............................ 202241036729

(51) Int. Cl.
*G06T 11/60* (2026.01)

(52) U.S. Cl.
CPC .......... *G06T 11/60* (2013.01); *G06T 2200/24* (2013.01)

(58) Field of Classification Search
CPC ...... G06F 3/011; G06T 11/60; G06T 2200/24; A63F 13/58; A63F 13/65; A63F 13/79; A63F 13/822; A63F 13/825; G06N 3/006
See application file for complete search history.

(56) References Cited

U.S. PATENT DOCUMENTS

| | | | | |
|---|---|---|---|---|
| 9,959,497 | B1 | 5/2018 | Ivanov | |
| 10,052,026 | B1 * | 8/2018 | Tran | A61B 5/0022 |
| 2012/0183940 | A1 * | 7/2012 | Aragones | G16H 20/30 434/247 |

(Continued)

OTHER PUBLICATIONS

International Search Report for International Application No. PCT/IN2023/050802 dated Jan. 9, 2024.

(Continued)

*Primary Examiner* — Xilin Guo
(74) *Attorney, Agent, or Firm* — Sughrue Mion, PLLC

(57) ABSTRACT

Disclosed is a computer-implemented system (110) for providing a virtual reality platform for a virtual environment that has characteristics of a real-world. The system (110) comprises a processor(s) (210) that obtains, from one or more user devices, user profile information and real-world data corresponding to a real-world user and thereby generates at least a virtual clone of the real-world user. The processor (210) further integrates the virtual clone with the virtual environment and monitors aging of the virtual clone in the virtual environment. Thereafter, the processor (210) tracks, with respect to a real-world time, one or more activities of the generated virtual clone based on a plurality of fundamental clone factors corresponding to the real-world user. Additionally, the processor (210) modifies an appearance of the generated virtual clone based on the monitoring of the aging and the tracking of the one or more activities.

20 Claims, 5 Drawing Sheets

(56) References Cited

U.S. PATENT DOCUMENTS

| | | | | |
|---|---|---|---|---|
| 2021/0004076 | A1 | 1/2021 | Schweet et al. | |
| 2023/0099393 | A1* | 3/2023 | Tumuluri | G06N 10/00<br>704/231 |
| 2025/0181139 | A1* | 6/2025 | Song | G16H 20/30 |

OTHER PUBLICATIONS

Written Opinion for International Application No. PCT/IN2023/050802 dated Jan. 9, 2024.

* cited by examiner

AI-BASED VIRTUAL REALITY PLATFORM AND AN OPERATING METHOD THEREOF

CROSS REFERENCE TO RELATED APPLICATIONS

This is a National Stage Application of International Application No. PCT/IN2023/050802 filed Aug. 25, 2023, claiming priority based on Indian Patent Application No. 202241036729 filed Aug. 27, 2022.

TECHNICAL FIELD

The present disclosure relates to the field of virtual reality based application platforms and more particularly relates to a computer-implemented system and method for providing an Artificial Intelligence (AI) based virtual reality platform for a virtual environment that has characteristics of a real-world.

BACKGROUND

In recent years, continuous innovation in software development has played a crucial role in shaping Virtual Reality (VR) platforms. Developers have created various applications, games, and other platforms specifically designed for VR environments.

Generally, the VR environment is a computer-generated three-dimensional environment with objects and scenes that appear to be real, making users feel they are immersed in their surroundings. The VR environment is perceived through electronic devices such as VR headsets. With this, VR platforms offer an impressive, intense, and immersive experience that brought virtual gaming and other application platforms to a whole new level of excellence.

However, existing VR tools and platforms present complete visual spaces that either only depict a limited area, for example, a room, or spaces that are not intended to reflect reality, for example, imaginary spaces like spaces within VR gaming. Furthermore, the existing VR tools and platforms do not accurately represent real-life activities or real-life gaming scenarios. In particular, the actions within existing VR platforms and solutions lack realism, and they operate on a separate time frame that is not aligned with the user's day-to-day life.

Therefore, it would be advantageous to provide an improved VR platform and solution that can overcome and address the above-mentioned limitations and drawbacks of the existing VR tools and solutions.

BRIEF SUMMARY

This summary is provided to introduce a selection of concepts in a simple manner that is further described in the detailed description of the disclosure. This summary is not intended to identify key or essential inventive concepts of the subject matter nor is it intended for determining the scope of the disclosure.

Embodiments of the present disclosure disclose a computer-implemented system for providing an Artificial Intelligence (AI) based virtual reality platform for a virtual environment that has characteristics of a real-world. The system comprises one or more processors configured to obtain, from one or more user devices, user profile information and real-world data corresponding to at least a first real-world user. The one or more processors are further configured to generate, using an AI model, at least a first virtual clone of the at least first real-world user based on the obtained user profile information and the real-world data and thereafter integrate the at least first virtual clone with the virtual environment. Furthermore, the one or more processors are configured to monitor aging of the at least first virtual clone in the virtual environment, and track, with respect to a real-world time, one or more activities of the generated at least first virtual clone based on a plurality of fundamental clone factors corresponding to the at least first real-world user. Additionally, the one or more processors are configured to modify, using an AI-based aging model, an appearance of the generated at least first virtual clone based on the monitoring of the aging and the tracking of the one or more activities of the generated at least first virtual clone.

Also, the embodiment of the present disclosure discloses a method for providing an AI-based virtual reality platform for a virtual environment that has characteristics of a real-world. The method includes obtaining, from one or more user devices, user profile information and real-world data corresponding to at least a first real-world user and thereafter generating, using an AI model, at least a first virtual clone of the at least first real-world user based on the obtained user profile information and the real-world data. The method further includes integrating the at least first virtual clone with the virtual environment and monitoring aging of the at least first virtual clone in the virtual environment. The method further includes tracking, with respect to a real-world time, one or more activities of the generated at least first virtual clone based on a plurality of fundamental clone factors corresponding to the at least first real-world user. Furthermore, the method includes modifying, using an AI-based aging model, an appearance of the generated at least first virtual clone based on the monitoring of the aging and the tracking of the one or more activities of the generated at least first virtual clone.

To further clarify the advantages and features of the present invention, a more particular description of the invention will be rendered by reference to specific embodiments thereof, which are illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF THE FIGURES

These and other features, aspects, and advantages of the present invention will become better understood when the following detailed description is read with reference to the accompanying drawings in which like characters represent like parts throughout the drawings, wherein.

Figure 1:
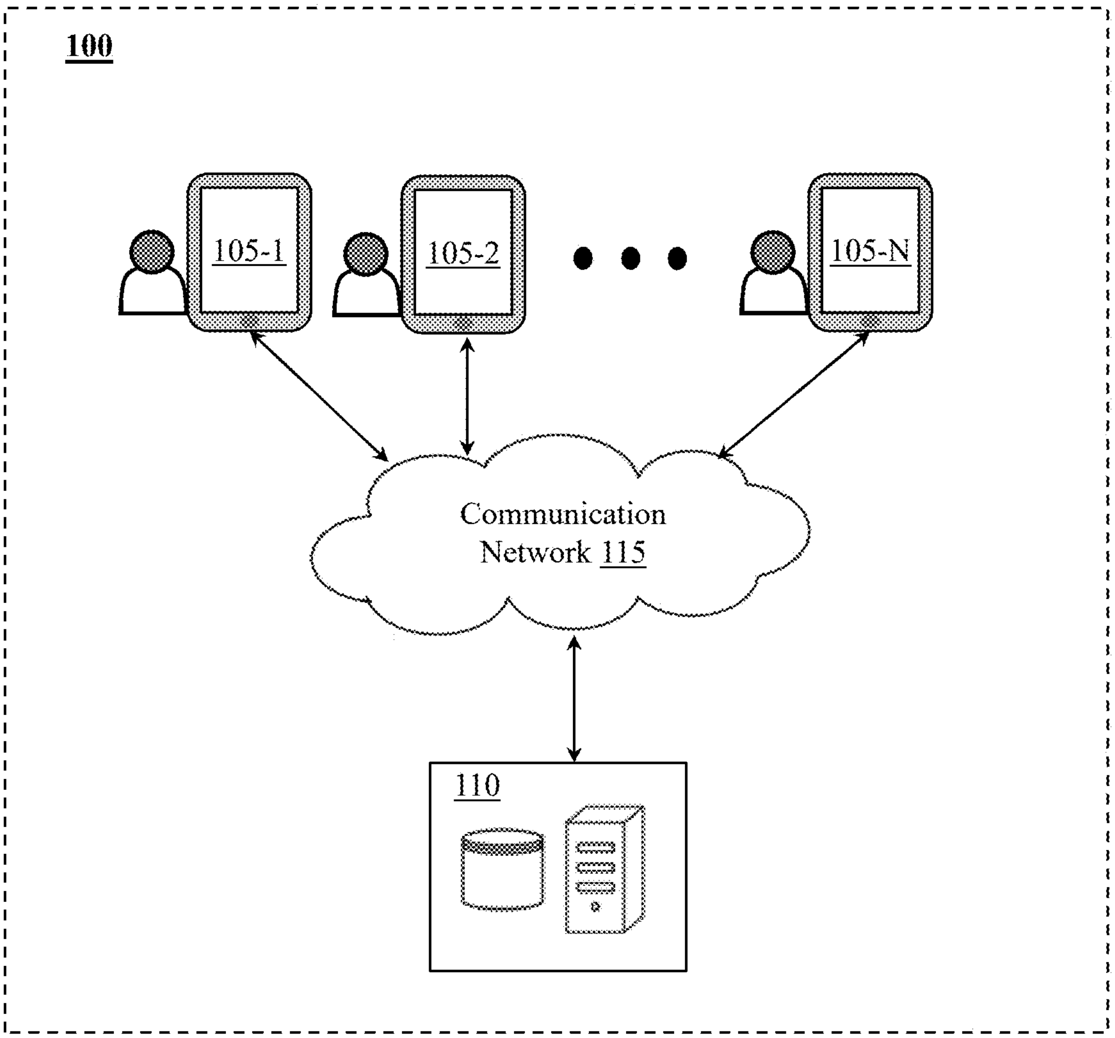
FIG. 1 illustrates an exemplary environment in which a virtual reality based social media and gaming platform is implemented, in accordance with an embodiment of the present disclosure.

Further, skilled artisans will appreciate that elements in the drawings are illustrated for simplicity and may not have necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications to the disclosure, and such further applications of the principles of the disclosure as described herein being contemplated as would normally occur to one skilled in the art to which the disclosure relates are deemed to be a part of this disclosure.

It will be understood by those skilled in the art that the foregoing general description and the following detailed description are exemplary and explanatory of the disclosure and are not intended to be restrictive thereof.

In the present disclosure, relational terms such as first and second, and the like, may be used to distinguish one entity from the other, without necessarily implying any actual relationship or order between such entities.

The terms "comprises", "comprising", or any other variations thereof, are intended to cover a non-exclusive inclusion, such that a process or method that comprises a list of steps does not include only those steps but may include other steps not expressly listed or inherent to such a process or a method. Similarly, one or more elements or structures or components preceded by "comprises . . . a" does not, without more constraints, preclude the existence of other elements, other structures, other components, additional devices, additional elements, additional structures, or additional components. Appearances of the phrase "in an embodiment", "in another embodiment" and similar language throughout this specification may but do not necessarily, all refer to the same embodiment.

Unless otherwise defined, all technical and scientific terms used herein have the same meaning as commonly understood by one of the persons ordinarily skilled in the art to which this disclosure belongs. The components, methods, and examples provided herein are illustrative only and not intended to be limiting.

Embodiments of the present disclosure will be described below in detail with reference to the accompanying figures.

Embodiments of the present disclosure disclose a virtual reality based social media and gaming platform, wherein a user may create one or more AI-Clones (hereinafter also referred to as "one or more virtual clones") which can be manipulated within the social media platform. Upon creation, the user may define basic characteristics and one or more goals for each of the one or more AI-Clones. In one embodiment of the present disclosure, the growth of the AI-Clones depends on a CloneBook Time (CBT) which has time units which are integral multiples of real-time units. In a preferred embodiment, the CloneBook time is sixty times faster than the real-world time and hence each minute in real-time is equal to one second in the CBT. Further, the appearance of AI-clones is derived using an AI-based aging model that derives appearance from Fundamental Clone Factors (FCFs) that are associated with respective AI-clones.

Referring to FIG. 1 illustrates an exemplary system environment 100 in which a virtual reality based social media and gaming platform is implemented, in accordance with an example embodiment of the present disclosure. As shown in FIG. 1, the exemplary environment 100 comprises a plurality of user devices 105-1 to 105-N, a server 110, and a communication network 115. The communication network 115 is configured to establish a connection between the plurality of user devices 105-1 to 105-N (hereinafter also referred to as "user device 105") and the server 110.

The user device 105, by way of example, may include a smartphone, a laptop, a notebook computer, a tablet, or any dedicated virtual reality device having communication capabilities. It will be appreciated by those skilled in the art that the user device 105 comprises one or more functional elements capable of communicating through the communication network 115 to receive one or more services offered by the server 110.

The communication network 115 may be a wireless network or a wired network or a combination thereof. The communication network 115 performs one or more functionalities of a network connection between the user device 105 and the server 110. Wireless networks may include long range wireless radio, wireless personal area network (WPAN), wireless local area network (WLAN), mobile data communications such as 3G, 4G, 5G, beyond 5G, or any other similar technologies. The communication network 115 may comprise a single, local network, a large network, or a plurality of small or large networks interconnected together. The communication network 115 may be implemented as one of the different types of networks, such as intranet, local area network (LAN), wide area network (WAN), the internet, and the like. The communication network 115 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like. Further, the communication network 115 may include a variety of network devices, including routers, bridges, servers, modems, computing devices, storage devices, and the like. In one implementation, the communication network 115 is the internet, which enables communication between various devices within the environment for enabling secure data communication among the devices. The communication network 115 may comprise a single, local network, a large network, or a plurality of small or large networks interconnected together.

The server 110 may include, for example, a computer server or a network of computers or a virtual server which provides functionalities or services for other programs or devices such as for the user device 105 associated with the users. In one implementation, the server 110 is a cloud server comprising one or more processors, associated processing modules, interfaces and storage devices communicatively interconnected to one another through one or more communication means for communicating information. The storage associated with the server 110 may include volatile and non-volatile memory devices for storing information and instructions to be executed by the one or more processors and for storing temporary variables or other intermediate information during processing. In one embodiment of the present disclosure, the server 110 is configured to host the virtual reality based social media and gaming platform which can be accessed by the users through the user device 105.

In particular, the server 110 facilitates a computer-implemented system environment for providing an AI-based virtual reality platform for a virtual environment that has characteristics of a real-world. The virtual environment includes a simulated instance of the least one of a real-world scenario, real-world events, and real-world environment. The real-world events include at least one of an entertainment event, a gaming event, or a social event in which a plurality of virtual clones of real-world users competes with each other in the real-time. The computer-implemented system environment facilitates one or more user interfaces for one or more dedicated applications of the virtual reality based social media and gaming platform installed in the user device 105 using which one or more AI-Clones (hereinafter also referred to as "one or more virtual clones") can be created. Upon creation, the one or more user interfaces provide, via the application installed in the user device 105, multiple options to the user using which the user may define the basic characteristics and the one or more goals for each of the one or more virtual clones.

Figure 2:
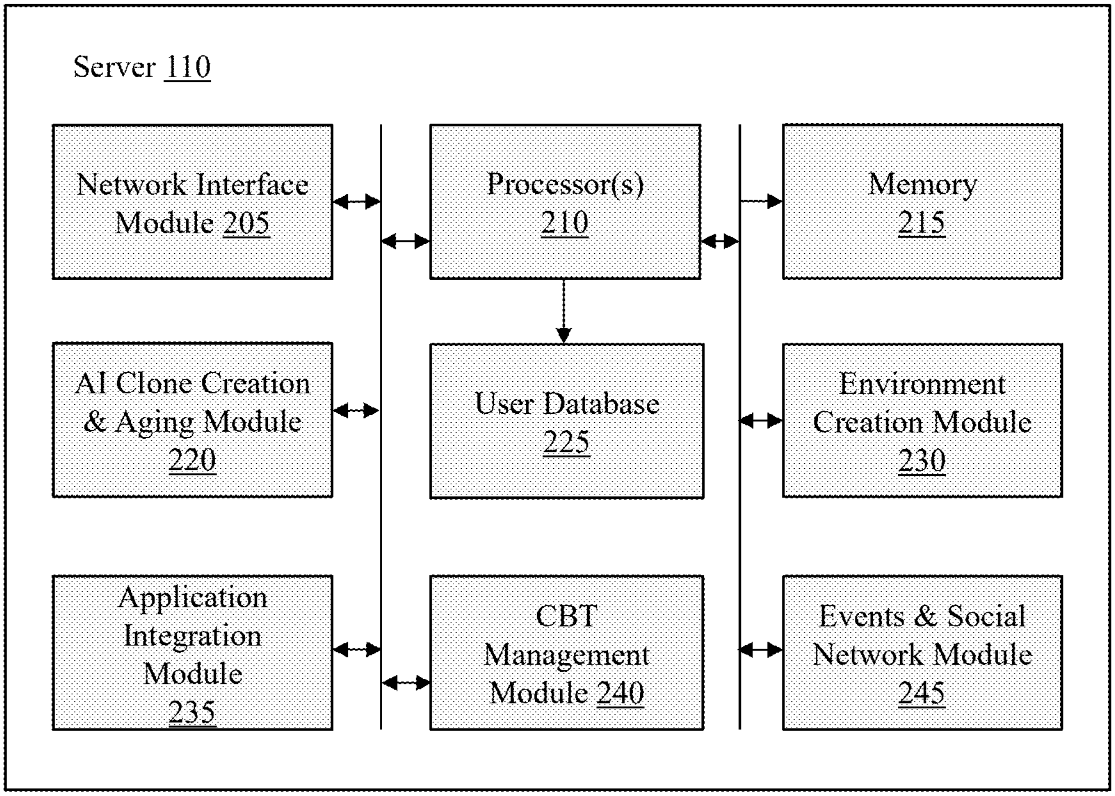
FIG. 2 illustrates a block diagram of a server hosting the virtual reality based social media and gaming platform, in accordance with an embodiment of the present disclosure.

FIG. 2 illustrates a block diagram of the server 110 hosting the virtual reality based social media and gaming platform, in accordance with an example embodiment of the present disclosure. As shown in FIG. 2, the server 110 comprises a network interface module 205, a processor(s) 210, a memory 215, an AI-Clone creation and aging module 220, a user database 225, an environment creation module 230, an application integration module 235, a CBT management module 240, and events and social network module 245.

In an example, the module(s) and/or the unit(s) and/or model(s) associated with the server 110 may include a program, a subroutine, a portion of a program, a software component, or a hardware component capable of performing a stated task or function. As used herein, the module(s) and/or the unit(s) and/or model(s) may be implemented on a hardware component such as a server independently of other modules, or a module can exist with other modules on the same server, or within the same program. The module(s) and/or unit(s) and/or model(s) may be implemented on a hardware component such as processor one or more microprocessors, microcomputers, microcontrollers, digital signal processors, central processing units, state machines, logic circuitries, and/or any devices that manipulate signals based on operational instructions.

In one or more embodiments, the module(s) and/or unit(s) and/or model(s), when executed by the processor(s) 210, may be configured to perform any of the described functionalities described below in the forthcoming paragraphs.

As well known in the art, the network interface module 205 enables communication between the plurality of user devices 105 and other connected devices through the communication network 115.

The memory 215 stores instructions to be executed by the processor 210. The memory 215 may include any non-transitory computer-readable medium known in the art including, for example, volatile memory, such as static random-access memory (SRAM) and dynamic random-access memory (DRAM), and/or non-volatile memory, such as read-only memory (ROM), erasable programmable ROM, flash memories, hard disks, optical disks, and magnetic tapes.

In one embodiment of the present disclosure, the AI-Clone creation and aging module 220 is configured to create or generate one or more virtual clones for each user of the virtual reality based social media and gaming platform based on inputs received from each of the users. That is, a user may register with the virtual reality based social media and gaming platform by providing necessary information and login credentials using the user device 105 associated with the user. Upon registration, the AI clone creation module and aging module 220 prompts the user to compile the one or more virtual clones for the user. In one embodiment, the user can provide input photos via the one or more user interfaces or use the camera of the user device 105 to provide input photos. Thereafter, the AI-Clone creation and aging module 220 uses facial recognition modules and similar tools to analyze the input photos and generates one or more unique virtual clones for the user based on the analysis of the input photos. Similarly, the AI-Clone creation and aging module 220 can create one or more unique virtual clones for each of the registered users of the virtual reality based social media and gaming platform. It is to be noted that the users may customize their virtual clones using one or more user interfaces provided in the one or more dedicated applications of the virtual reality based social media and gaming platform installed in the user device 105. That is to say, the users may create styles, colors, clothing, etc. However, in one implementation, the virtual clones reflect the real users.

In some embodiments, the processor 210 is configured to obtain, from the plurality of user devices 105-1 to 105-N, user profile information and real-world data corresponding to real-world users. In a non-limiting example, the processor 210 may obtain from a first user device 105-1, the user profile information and the real-world data corresponding to a first real-world user. Once the user profile information and the real-world data corresponding to the first real-world user are obtained, the AI-Clone creation and aging module 220 is configured to generate, using an AI model, a first virtual clone of the first real-world user based on the obtained user profile information and the real-world data.

In one embodiment of the present disclosure, the user database 225 stores information associated with the registered users and information related to the one or more virtual clones of each of the users. Such information may include but is not limited to username, age, residential information, interests and hobbies, relationship between each user's own virtual clones, relationship between virtual clones of the other users of the virtual reality based social media and gaming platform, achievements of the virtual clones of each of the users, etc. In particular, the user database 225 stores a plurality of fundamental clone factors corresponding to clones of each of the real-world users in the virtual environment. In a non-limiting example, the plurality of fundamental clone factors may include but are not limited to, each of an age, health, appearance, learning capacity, physical skills, social skills, a social network, circle of friends, activity factor, an acquired intelligence quotient, a social quotient, a luck quotient, a circle of influence, a success factor, and a popularity index of the clones of each of the real-world users in the virtual environment. The corresponding fundamental clone factor among the plurality of fundamental clone factors depends on one or more sets of fundamental clone factors among the plurality of fundamental clone factors. For example, the age of the clones in the virtual environment may depend on factors such as health and appearance. Similarly, the health of the clones may depend on the activity factor, the social network, the circle of friends, the skill grades, and the acquired intelligence of the clones in the virtual environment. Similarly, the appearance of the clones in the virtual world may depend on their health, physical skills, activity factor, social quotient, and the like.

In particular, the fundamental clone factors are interlinked and interdependent on each other in such a way that overall clone development can be depicted using the development of these fundamental clone factors. In a non-limiting example, an example format of storing the plurality of fundamental clone factors in the user database 225 is shown below in Table 1. Table 1 depicts a list of fundamental clone factors and the dependent factors. Each of the plurality of fundamental clone factors in the list as shown below in Table 1, illustrates how each of the corresponding fundamental clone factors among the plurality of fundamental clone factors depends on one or more sets of fundamental clone factors among the plurality of fundamental clone factors.

TABLE 1

| FCF | Dependent Factors | Remarks |
|---|---|---|
| Age | Health, Appearance | |
| Health | Activity Factor, Social Network, Friend Circle, Skill Grades, Acquired Intelligence | |
| Appearance | Health, Physical Skills, Activity Factor, Social Quotient | |
| Learning capacity | Activity Factor, Acquired Intelligence, Social Network, Friends Circle, Social Quotient, Circle of Influence | |
| skill1 Grade (Physical) | Activity Factor, Circle of Influence, Popularity Index, Friends Circle, Social Network | Physical Skills - Endurance, Strength, Flexibility, Specific Game skill |
| Skill2 Grade (Social) | Activity Factor, Circle of Influence, Popularity Index, Friends Circle, Social Network | Social Skills - Friendliness, Trendiness, Tactfulness, Specific Skills |
| Skill3 Grade (Physical or Social) | Activity Factor, Circle of influence, Popularity Index, Friends Circle, Social Network | Social Skills - Friendliness, Trendiness, Tactfulness, Specific Skills |
| Social Network | Activity Factor, Friends Circle, Circle of Influence | |
| Friends Circle | Social Network, Activity Factor, Social Quotient, Acquired Intelligence, Skills, Success Factors | |
| Activity Factor | User Routines, Friends Circle, Social Network, Circle of Influence | |
| Acquired Intelligence (IQ) | Activity Factor, Success Factor, Friend's Circle, Social Network, Social Quotient, Circle of Influence, Popularity Index | |
| Social Quotient (SQ) | Activity Factor, Success Factor, Friend's Circle, Social Network, Social Quotient, Circle of Influence, Popularity Index | |
| Luck Quotient (LQ) | Activity Factor, Social Network, Social Quotient, Circle of Influence, Popularity Index | |
| Circle of Influence | Social Network (Followers), Friend circle, Activity factor, Success Factor | |
| Success Factor | All fundamental clone factors | |
| Popularity Index | All fundamental clone factors | |

In one embodiment of the present disclosure, the environment creation module 230 may be configured to create one or more virtual environments in the virtual reality based social media and gaming platform. That is, the environment creation module 230 is configured to create an augmented environment of real-world locations and integrate users' interactable objects with corresponding real-world objects. Hence, the virtual environment may include maps and locations of the earth, virtual objects representing the real-world objects, such as buildings, vehicles, machines, commercial spaces, etc. Hence, the environment creation module 230 creates virtual environments representing the real-world. Additionally, the environment creation module 230 may create only virtual environments and virtual objects based on the implementation and requirement. The environment creation module 230 may also create environments for the events conducted as per the event and social network module 245.

In one embodiment of the present disclosure, the application integration module 235 is configured to integrate various applications with the virtual reality based social media and gaming platform. The applications may include but are not limited to messaging applications, recreational applications, gaming applications, social media applications, etc. Using such applications, the virtual clones (users) may communicate with other users, participate in games, recreational activities, etc. In addition, the AI-based virtual reality platform implemented in the server 110, may use such applications for creating events as per the event and social network module 245, so that the virtual clones can participate in such events to achieve goals that are predefined by the users. Accordingly, in a non-limiting example, the application integration module 235 integrates the first virtual clone with the virtual environment.

Upon creating the virtual clones and integrating the virtual clones with the virtual environment, the AI-Clone creation and aging module 220 uses an AI-based aging algorithm to monitor the aging of the virtual clones in the virtual environment. The aging is monitored and managed as per time depicted by the CBT management module 240. The AI-Clone creation and aging module 220 also tracks, with respect to a real-world time, one or more activities of the generated virtual clones based on the plurality of fundamental clone factors corresponding to the real-world users.

In one or more embodiments, the growth of the virtual clones depends on the CloneBook time which has time units which are integral multiples of real-time units. In one embodiment of the present disclosure, the CBT management module 240 maintains a clock for the virtual reality based social media and gaming platform. In a preferred embodiment, the CBT management module 240 creates, with respect to real-world time-zones, a virtual time-zone for the virtual environment. The created virtual time-zone has a virtual time that elapses sixty times faster than the real-world time. In particular, the virtual time corresponds to the CloneBook time and hence each second in real-time is equal to one minute in the virtual time-zone. In other words, the CBT has a direct relationship with a Gregorian calendar that is widely used across the world. However, the time calculation may have time units which are multiples of real-time units. Once, the virtual time-zone for the virtual environment is created, then the CBT management module 240 integrates the created virtual time-zone with the virtual environment such that any real-world time instance is translated to a time instance in the created virtual time-zone and vice-versa.

For example, "Time Zero" is defined as 1 Jan. 2050, at 00:00:00 hrs. Each minute in real-time is considered as one second in the virtual time-zone. So, the virtual time will move 60 times faster than real-time in both directions. The time before "time zero" is defined as "before time-zero" (BTZ) and time after "time-zero" is defined as "after time-zero" (ATZ). There is a direct correlation between the real-time to the virtual time. In this implementation, one year in real-time corresponds to sixty years in CBT. So, 1 Jan. 2049 00:00:00 would be Year BZT-60 00:00 hr in CBT. Similarly, 1 Jan. 2052 00:00:00 would be Year AZT-120 00:00 hr in CBT. The rest of the calendar is derived based on the years in such a way that there is a one-to-one correlation of years between the real-time and the virtual time such that one year in real-time will always translate to 60 years in the virtual time-zone. According to the above-provided example, the virtual time can be easily perceivable by the users because one minute in the real-world translates to a second in the virtual time-zone. Human brains are tuned from childhood to have an estimation of time in seconds, minutes, hours, and days. Thus, multiplication factors of sixty can be easily processed by human brains and can easily correlate to virtual world time without having to depend on machines/devices to calculate time.

In one embodiment of the present disclosure, live world scenarios are simulated in the AI-based virtual reality platform that is implemented in the server 110. Since there is always a correlation between the CBT and the real-time, the modules and components of the server 110 can derive ages and events of virtual clones corresponding to any real-time based on the "time-zero" definition of the platform. A normal lifetime of a virtual clone is 60 years in the virtual time created by the CBT management module 240. So, an average virtual clone will live for one year in real-time in which it completes its entire life cycle. However, the lifespan of the virtual clone may increase or decrease based on the health factors of the virtual clone.

In one or more embodiments of the present disclosure, the AI-based virtual reality platform implemented in the server 110 facilitates the users to navigate through the virtual world using user devices and make their virtual clones participate in events and contests generated by the virtual platform as per the events and social network module 245. In one embodiment, the virtual clones of a user may be rewarded based on the active time spent on the AI-based virtual reality platform, good behavior in-game, feedback from the other users, social networking on the AI-based virtual reality platform, etc.

Further, in one or more embodiments, the processor 210 is configured to modify, using an AI-based aging model, an appearance of the generated virtual clones based on the monitoring of the aging and the tracking of the one or more activities of the generated virtual clones. In particular, the processor 210 modifies, using the AI clone creation and aging module 220, the appearance of the AI-Clones using an AI-based aging software that derives the appearance of the generated virtual clones in the virtual environment from the Fundamental Clone Factors (FCFs) associated with respective virtual clones in the virtual environment. Additionally, the processor 210 may be configured to provide a specific status to the virtual clone or wreck the virtual clone from the virtual environment.

According to some embodiments of the present disclosure, the processor 210 may also control the user device 105, for instance, user device 105-1 to display a graphical user interface to receive one or more user inputs. Once the one or more user inputs specifying a user's lifetime goal and basic characteristics of clones including different aspects of appearances, are received by the processor 210, then the processor 210 generates virtual clones based on the received one or more user inputs. Accordingly, in a non-limiting example, the processor 210 generates the first virtual clone based on the one or more user inputs received from the user device 105-1.

Figure 3:
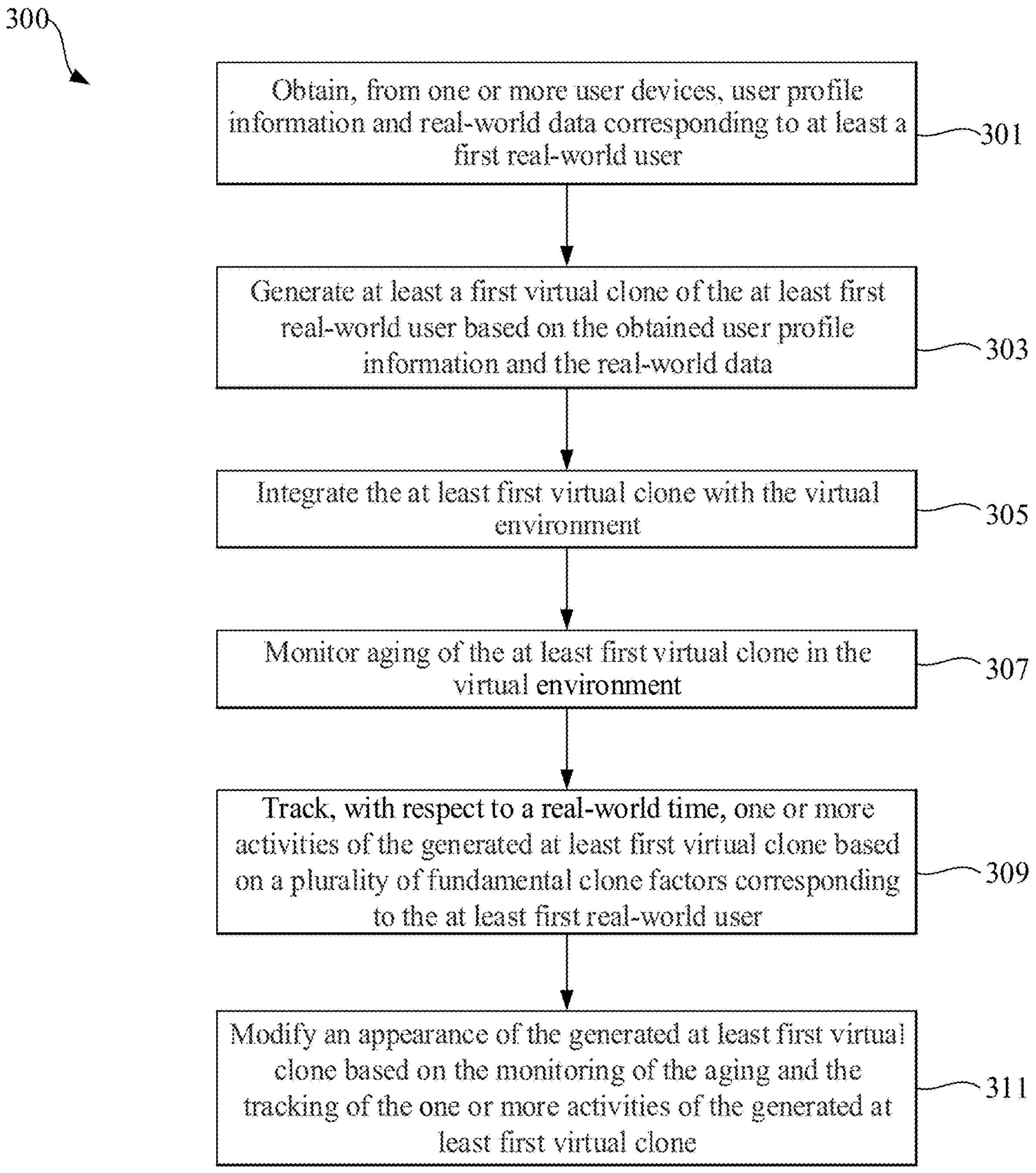
FIG. 3 illustrates a flow chart of a method for providing an AI-based virtual reality platform for a virtual environment that has characteristics of a real-world, in accordance with an embodiment of the present disclosure.

Referring to FIG. 3 illustrates a flow chart of a method 300 for providing the AI-based virtual reality platform for the virtual environment that has characteristics of the real-world, in accordance with an embodiment of the present disclosure. The method 300 includes a series of method steps 301 through 311 performed by one or more components, units, and modules of the server 110. It is to be noted that the module(s) and/or unit(s) and/or model(s) of the server 110, when executed by the processor(s) 210, are configured to perform method steps of the method 300. Therefore, an example description related to other modules and units of the server 110 is omitted herein for the sake of brevity of the explanation of the method steps 301 through 311.

At step 301, the processor 210 obtains, from the plurality of user devices 105-1 to 105-N, the user profile information and the real-world data corresponding to the real-world users. In a non-limiting example, the processor 210 obtains from the first user device 105-1, the user profile information and the real-world data corresponding to the first real-world user. The flow of the method 300 now proceeds to step 303.

At step 303, the processor 210 generates one or more virtual clones for the real-world users based on the obtained user profile information and the real-world data corresponding to the real-world users. In a non-limiting example, the processor 210 may generate the first virtual clone of the first real-world user based on the obtained user profile information and the real-world data corresponding to the first real-world user. For instance, the processor 210 may use the AI model to generate the first virtual clone. The flow of the method 300 now proceeds to step 305.

At step 305, the processor 210 integrates the generated one or more unique virtual clones with the virtual environment. In a non-limiting example, the processor 210 may integrate the first virtual clone with the virtual environment. For instance, the processor 210 may integrate the first virtual clone with the various applications with the virtual reality based social media and gaming platform. The flow of the method 300 now proceeds to step 307.

At step 307, the processor 210 monitors the aging of the one or more unique virtual clones in the virtual environment. The processor 210 may use the AI-based aging algorithm to monitor the aging of the one or more unique virtual clones. In a non-limiting example, the processor 210 may monitor the aging of the first virtual clone in the virtual environment. A detailed description of operations involved in the process of monitoring the aging of the virtual clone is described below in forthcoming paragraphs in conjunction with FIG. 4 of the drawings. The flow of the method 300 now proceeds to step 309.

At step 309, the processor 210 tracks one or more activities of the generated one or more unique virtual clones based on the plurality of fundamental clone factors corresponding to the real-world users. In a non-limiting example, the processor 210 may track one or more activities of the first virtual clone based on the plurality of fundamental clone factors corresponding to the first real-world user as shown above in table 1. The flow of the method 300 now proceeds to step 311.

At step 311, the processor 210 modifies the appearance of the one or more unique generated virtual clones based on the monitoring of the aging and the tracking of the one or more activities of the generated one or more unique virtual clones. The processor 210 may use the AI-based aging algorithm to modify the appearance of the one or more unique generated virtual clones. In a non-limiting example, the processor 210 may modify the appearance of the first virtual clone based on the monitoring of the aging and the tracking of the one or more activities of the generated first virtual clone.

Figure 4:
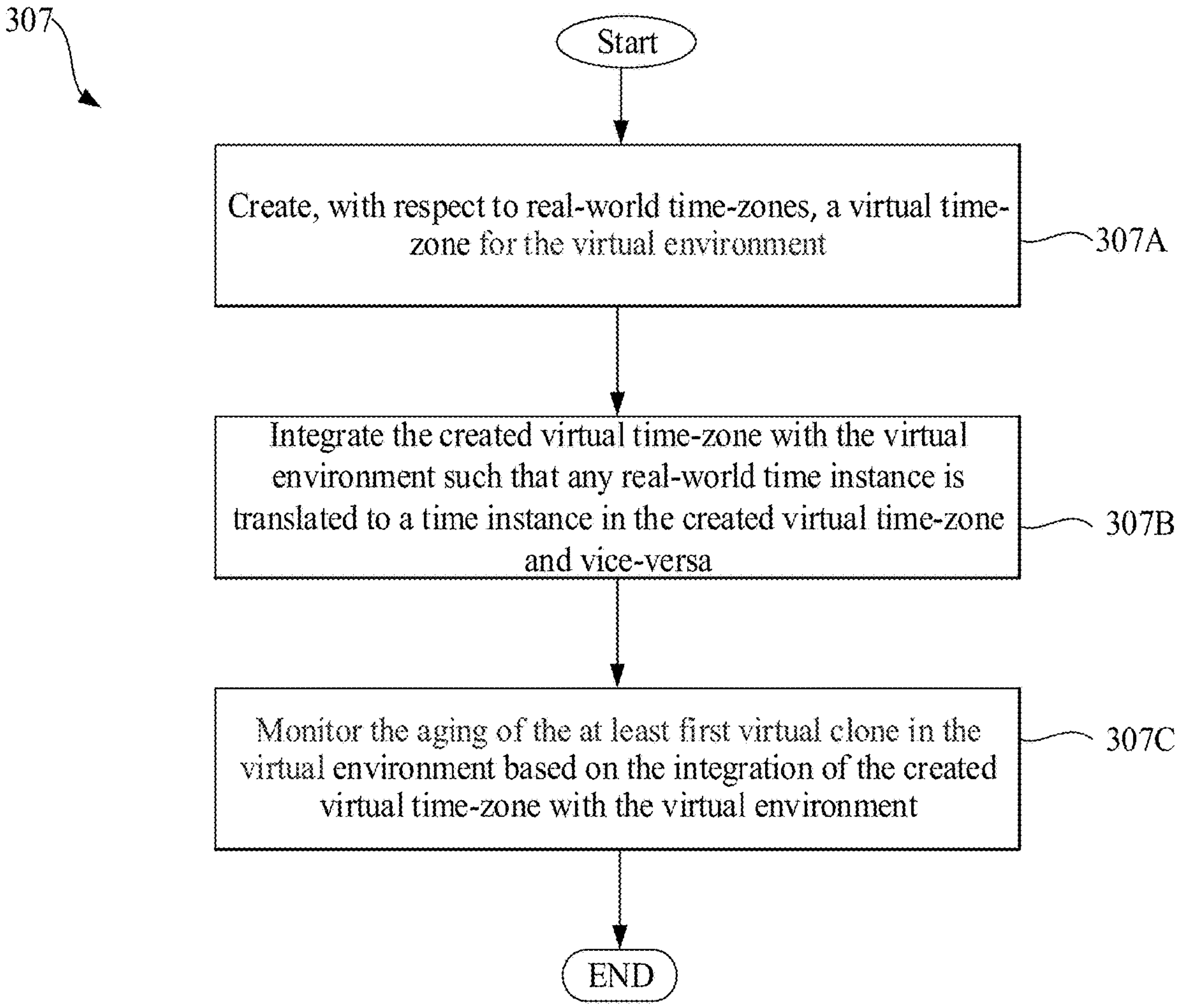
FIG. 4 illustrates a flow chart of a method for monitoring aging of a virtual clone in the virtual environment, in accordance with an embodiment of the present disclosure.

Referring now to FIG. 4, illustrates a flow chart of sub-steps of the method step 307 of FIG. 3, in accordance with an embodiment of the present disclosure. The method 307 includes a series of sub-method steps 307A through 307C performed by the processor 210 in conjunction with the AI-Clone creation and aging module 220.

At sub-step 307A, the processor 210 creates, with respect to the real world time-zones, the virtual time-zone for the virtual environment. For instance, the created virtual time-zone has the virtual time that elapses sixty times faster than the real-world time. The flow of the sub-steps of the method step 307 now proceeds to sub-step 307B.

At sub-step 307B, the processor 210 integrates the created virtual time-zone with the virtual environment such that any real-world time instance is translated to a time instance in the created virtual time-zone and vice-versa. The flow of the sub-steps of the method step 307 now proceeds to sub-step 307C.

At sub-step 307C, the processor 210 monitors, using the AI-based aging algorithm, the aging of the one or more unique virtual clones in the virtual environment based on the integration of the created virtual time-zone with the virtual environment. In a non-limiting example, the processor 210 may monitor the aging of the first virtual clone in the virtual environment.

Figure 5:
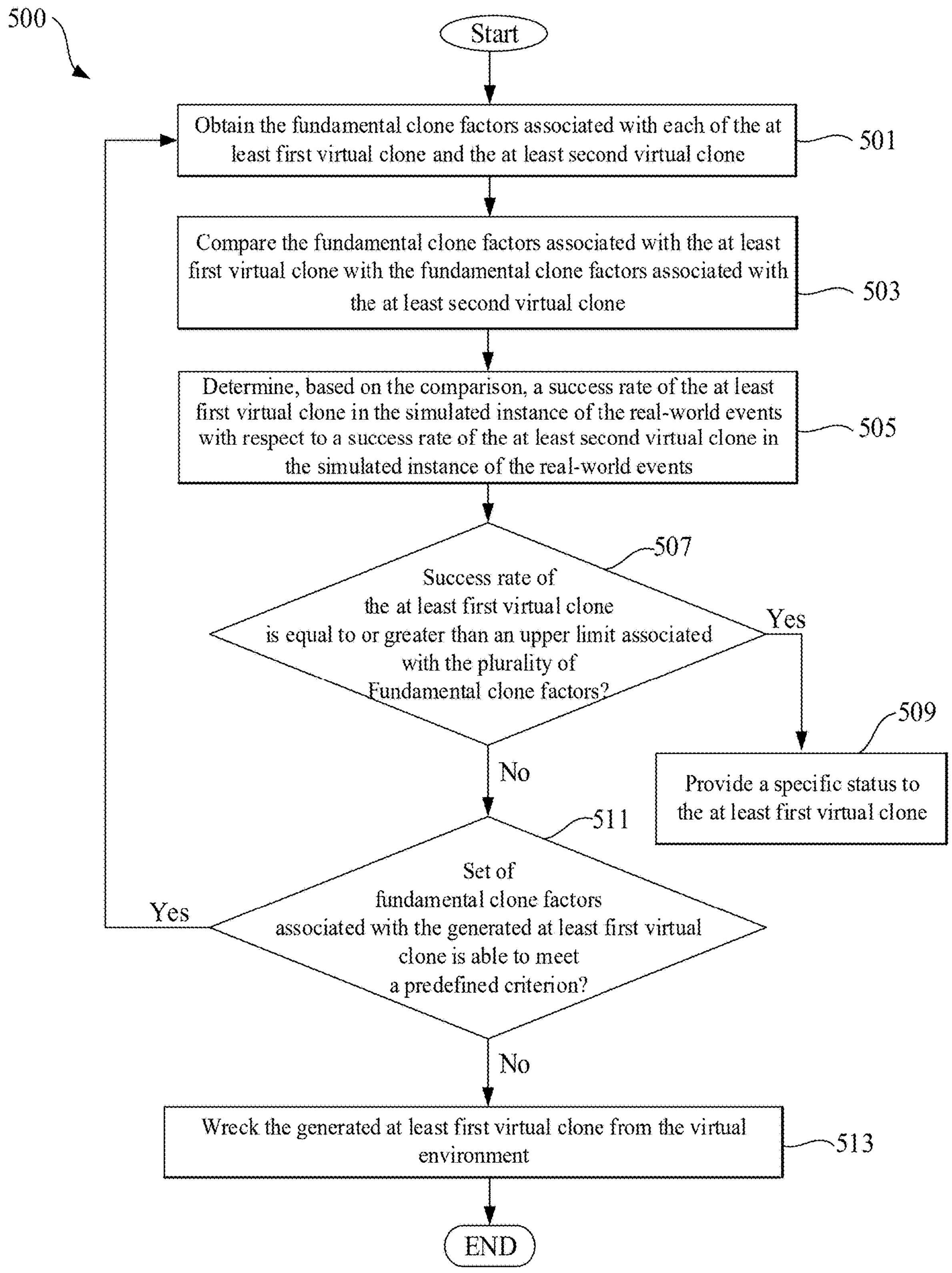
FIG. 5 illustrates a flow chart of a method for providing a specific status to the virtual clone or wrecking the virtual clone from the virtual environment, in accordance with an embodiment of the present disclosure.

Referring now to FIG. 5 illustrates a flow chart of a method 500 for providing the specific status to the virtual clone or wrecking the virtual clone from the virtual environment, in accordance with an embodiment of the present disclosure. The method 500 includes a series of method steps 501 through 513 performed by one or more components, units, and modules of the server 110. It is to be noted that the module(s) and/or unit(s) and/or model(s) of the server 110, when executed by the processor(s) 210, are configured to perform method steps of the method 500. Therefore, an example description related to other modules and units of the server 110 is omitted herein for the sake of brevity of the explanation of the method steps 501 through 513. The explanation of the method steps 501 through 511 is provided with the help of two real-world users and their virtual clones. However, it is to be understood by a person skilled in the art that the method 500 can be applied to "n" number of real-world users and their virtual clones, where n is a positive integer greater than one.

At step 501, the processor 210 obtains the fundamental clone factors associated with at least each of the first virtual clone and a second virtual clone of a second real-world user. In a non-limiting example, the processor 210 may obtain the fundamental clone factors associated with the first virtual clone from the first user device 105-1 and the fundamental clone factors associated with the second virtual clone from the second user device 105-2. The flow of the method 500 now proceeds to step 503.

At step 503, the processor 210 compares the fundamental clone factors associated with the first virtual clone with the fundamental clone factors associated with the second virtual clone. The flow of the method 500 now proceeds to step 505.

At step 505, the processor 210 determines, based on the comparison, a success rate of the first virtual clone in the simulated instance of the real-world events with respect to a success rate of the second virtual clone in the simulated instance of the real-world events. For instance, the processor 210 determines the success rate of the first virtual clone with respect to the success rate of the second virtual clone based on a result of the comparison performed at 503 of the method 500. The flow of the method 500 now proceeds to step 507.

At step 507, the processor 210 determines whether the success rate of the first virtual clone is equal to or greater than an upper limit associated with the plurality of fundamental clone factors. In a case, if a result of the determination performed at step 507 is yes, then the processor 210 (at step 509) provides the specific status to the first virtual clone. In particular, each of the fundamental clone factors acts as guiding principles for virtual clone development. The users need to constantly try to improve these factors using activities like contests and by defining day-to-day routines for their virtual clones. These fundamental clone factors have conflicting effects on each other and hence balancing them well is the key challenge for users of the virtual reality based social media and gaming platform. Thus, the generated virtual clones compete for their existence and progression on the platform by developing skills to achieve celebrity status called Nirvana. There are certain limits (upper bounds) for fundamental clone factors and if the success rate of the virtual clones becomes equal to or greater than the upper bound limits, then the processor 210 provides the celebrity status to those virtual clones.

Further, if in a case the result of the determination performed at step 507 is No, then the processor 210 (at step 511) determines whether a set of fundamental clone factors among the plurality of fundamental clone factors associated with the first virtual clone is able to meet a predefined criterion. The predefined criterion may correspond to a criterion that indicates the virtual clone is about to complete or already completed his/her life in the virtual world in accordance with the CBT. For instance, the predefined criterion may be defined based on the factors of age, health, activity, and progress made on the AI-based virtual reality platform. If in a case the result of the determination performed at step 511 is No, then the flow of the method 500 proceeds to step 513, where the processor 210 wrecks the generated first virtual clone from the virtual environment. Once a virtual clone is wrecked, the wrecked virtual clone can never become active again and will leave its legacy on the AI-based virtual reality platform implemented in the server 110. Furthermore, if in a case the result of the determination performed at step 511 is yes, then the processor 210 repeats the operations that are performed at steps 501 through 511 until the result of the determination performed at step 511 becomes No.

In one or more embodiments as described hereinabove, the processor 210 is further configured to control the user device 105 of the real-world users to display the graphical user interface including an option to wreck the generated virtual clones in order to create new virtual clones. If the processor 210 determines that a user input is received for wrecking a virtual clone among the generated virtual clones, then the processor 210 wrecks the virtual clone from the virtual environment corresponding to which the user input is received. Although, the disclosed AI-based virtual reality platform provides options for creating the new virtual clones, however, each user can only have only three virtual clones at any point in time. Accordingly, the processor 210 may also be configured to detect, in real-time, a number of virtual clones that are generated corresponding to each of the real-world users and restricts a subsequent generation of the one more clone corresponding to the at least first real-world user when a total number of generated virtual clones become three.

In one or more embodiments as described hereinabove, the processor 210 is further configured to select one of the virtual clones to become an agent clone based on an input received from one of the virtual clones to become the agent clone. The selection of the agent clone helps in managing and developing events on the disclosed AI-based virtual reality platform. The popularity and success of the agent clone may depend on a number of virtual clones participating in the events organized by the agent clone. Also, the processor 210 is further configured to select one or more sibling virtual clones of the agent clone and provides them with an advantage of success in the events conducted by the agent clone.

In one or more embodiments as described hereinabove, the disclosed system provides a user interface for the agent clones to create and conduct one or more events on the AI-based virtual platform. Examples of the one or more events may include but are not limited to, football world-cup, NBA championships, cricket world-cup, tennis grand slams, chess competitions, etc. Furthermore, the one or more events may also include but are not limited to, tests, quizzes, athletic events, skill evaluation activities, etc. Such events can be created for the entire virtual clones of the AI-based virtual platform (for all the users) or specific virtual clones which are in pre-defined cohorts, for example, students, beginners, celebrities, etc. The events may have participation from different virtual clones on the AI-based virtual platform and the processor 210 may provide strength to event winners in terms of success factors.

The above-disclosed AI-based virtual reality platform can be embodied in a plurality of different applications such as social media, gaming, and virtual reality platforms. From the social media, virtual reality, and gaming point of view, the disclosed AI-based virtual reality platform may revolutionize the online interaction as it imitates real-life scenarios, there exists a correlation between the real-time and CBT and diminishes the feeling of being a screen apart from one another.

Further, the above-disclosed AI-based virtual reality platform and methods provide various technical effects and advantages such as providing a simplified platform considering real-world situations by using real-world geographies and real-world environments such a way that the virtual world can be easily perceived by humans using real-world pictures or videos rather than having to create these environments newly. Thus, user experience while using the AI-based virtual platform can be enhanced.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible.

I claim:

1. A computer-implemented system for providing an Artificial Intelligence based virtual reality platform for a virtual environment that has characteristics of a real-world, the system-comprising:

one or more processors configured to:

obtain, from one or more user devices, user profile information and real-world data corresponding to at least a first real-world user;

generate, using an AI model, at least a first virtual clone of the at least first real-world user based on the obtained user profile information and the real-world data;

integrate the at least first virtual clone with the virtual environment;

monitor aging of the at least first virtual clone in the virtual environment;

track, with respect to a real-world time, one or more activities of the generated at least first virtual clone based on a plurality of fundamental clone factors corresponding to the at least first real-world user; and modify, using an AI-based aging model, an appearance of the generated at least first virtual clone based on the monitoring of the aging and the tracking of the one or more activities of the generated at least first virtual clone.

2. The system of claim 1, wherein:

the virtual environment includes a simulated instance of the least one of a real-world scenario, real-world events, and real-world environment, and the real-world events include at least one of an entertainment event, a gaming event, or a social event in which a plurality of virtual clones of real-world users compete with each other in the real-time.

3. The system of claim 2, wherein:

the virtual environment includes at least a second virtual clone of at least a second real-world user, and the one or more processors are configured to:

determine, based on a comparison of the fundamental clone factors associated with the at least first virtual clone with the fundamental clone factors associated with the at least second virtual clone, a success rate of the at least first virtual clone in the simulated instance of the real-world events with respect to a success rate of the at least second virtual clone in the simulated instance of the real-world events;

determine whether the success rate of the at least first virtual clone is equal to or greater than an upper limit associated with the plurality of fundamental clone factors; and provide a specific status to the at least first virtual clone based on a determination that the success rate of the at least first virtual clone is equal to or greater than the upper limit associated with the plurality of fundamental clone factors.

4. The system of claim 3, wherein the one or more processors are configured to:

determine whether a set of fundamental clone factors among the plurality of fundamental clone factors associated with the generated at least first virtual clone is able to meet a predefined criterion; and wreck the generated at least first virtual clone from the virtual environment based on a determination that the set of fundamental clone factors associated with the generated at least first virtual clone is unable to meet the predefined criterion.

5. The system of claim 1, wherein, to monitor the aging of the at least first virtual clone in the virtual environment, the one or more processors are configured to:

create, with respect to real-world time-zones, a virtual time-zone for the virtual environment, wherein the created virtual time-zone has a virtual time that elapses sixty times faster than the real-world time; and integrate the created virtual time-zone with the virtual environment such that any real-world time instance is translated to a time instance in the created virtual time-zone and vice-versa.

6. The system of claim 1, wherein the plurality of fundamental clone factors includes:

an age of the at least first virtual clone in the virtual environment, a health of the at least first virtual clone in the virtual environment, an appearance of the at least first virtual clone in the virtual environment, a learning capacity of the at least first virtual clone in the virtual environment, physical skills of the at least first virtual clone in the virtual environment, social skills of the at least first virtual clone in the virtual environment, a social network of the at least first virtual clone in the virtual environment, and a circle of friends of the at least first virtual clone in the virtual environment.

7. The system of claim 6, wherein the plurality of fundamental clone factors further includes:

an activity factor of the at least first virtual clone in the virtual environment, an acquired intelligence quotient of the at least first virtual clone in the virtual environment, a social quotient of the at least first virtual clone in the virtual environment, a luck quotient of the at least first virtual clone in the virtual environment, a circle of influence corresponding to the at least first virtual clone in the virtual environment, a success factor of the at least first virtual clone in the real-world events of the virtual environment, and a popularity index of the at least first virtual clone in the virtual environment.

8. The system of claim 7, wherein a corresponding fundamental clone factor among the plurality of fundamental clone factors depends on one or more sets of fundamental clone factors among the plurality of fundamental clone factors.

9. The system of claim 1, wherein the one or more processors are configured to:

control a user device of the at least first real-world user to display a graphical user interface to receive one or more user inputs;

receiving, via the graphical user interface, the one or more user inputs specifying a user's lifetime goal and basic characteristics of clones including different aspects of appearances; and generate, using the AI model, the at least first virtual clone based on the received one or more user inputs.

10. The system of claim 1, wherein the one or more processors are configured to:

control a user device of the at least first real-world user to display a graphical user interface including an option to wreck the generated at least first virtual clone; and wreck the generated at least first virtual clone from the virtual environment based on receipt of a user input in response to the displayed option on the graphical user interface.

11. The system of claim 10, wherein the one or more processors are configured to:

detect, in real-time, a number of clones that are generated corresponding to the at least first real-world user; and restrict a subsequent generation of one more clone corresponding to the at least first real-world user when a total number of generated clones is three.

12. A method for providing an Artificial Intelligence based virtual reality platform for a virtual environment that has characteristics of a real-world, the method comprising:

obtaining, from one or more user devices, user profile information and real-world data corresponding to at least a first real-world user;

generating, using an AI model, at least a first virtual clone of the at least first real-world user based on the obtained user profile information and the real-world data;

integrating the at least first virtual clone with the virtual environment;

monitoring aging of the at least first virtual clone in the virtual environment;

tracking, with respect to a real-world time, one or more activities of the generated at least first virtual clone based on a plurality of fundamental clone factors corresponding to the at least first real-world user; and modifying, using an AI-based aging model, an appearance of the generated at least first virtual clone based on the monitoring of the aging and the tracking of the one or more activities of the generated at least first virtual clone.

13. The method of claim 12, wherein:

the virtual environment includes a simulated instance of the least one of a real-world scenario, real-world events, and real-world environment, and the real-world events include at least one of an entertainment event, a gaming event, or a social event in which a plurality of virtual clones of real-world users compete with each other in the real-time.

14. The method of claim 13, wherein:

the virtual environment includes at least a second virtual clone of at least a second real-world user, and the method comprises:

determining, based on a comparison of the fundamental clone factors associated with the at least first virtual clone with the fundamental clone factors associated with the at least second virtual clone, a success rate of the at least first virtual clone in the simulated instance of the real-world events with respect to a success rate of the at least second virtual clone in the simulated instance of the real-world events;

determining whether the success rate of the at least first virtual clone is equal to or greater than an upper limit associated with the plurality of fundamental clone factors; and providing a specific status to the at least first virtual clone based on a determination that the success rate of the at least first virtual clone is equal to or greater than the upper limit associated with the plurality of fundamental clone factors.

15. The method of claim 14, comprising:

determining whether a set of fundamental clone factors among the plurality of fundamental clone factors associated with the generated at least first virtual clone is able to meet a predefined criterion; and wrecking the generated at least first virtual clone from the virtual environment based on a determination that the set of fundamental clone factors associated with the generated at least first virtual clone is unable to meet the predefined criterion.

16. The method of claim 12, wherein, monitoring the aging of the at least first virtual clone in the virtual environment comprises:

creating, with respect to real-world time-zones, a virtual time-zone for the virtual environment, wherein the created virtual time-zone has a virtual time that elapses sixty times faster than the real-world time; and integrating the created virtual time-zone with the virtual environment such that any real-world time instance is translated to a time instance in the created virtual time-zone and vice-versa.

17. The method of claim 12, comprising:

detecting, in real-time, a number of clones that are generated corresponding to the at least first real-world user; and restricting a subsequent generation of one more clone corresponding to the at least first real-world user when a total number of generated clones is three.

18. The method of claim 12, wherein the plurality of fundamental clone factors includes:

an age of the at least first virtual clone in the virtual environment, a health of the at least first virtual clone in the virtual environment, an appearance of the at least first virtual clone in the virtual environment, a learning capacity of the at least first virtual clone in the virtual environment, physical skills of the at least first virtual clone in the virtual environment, social skills of the at least first virtual clone in the virtual environment, a social network of the at least first virtual clone in the virtual environment, and a circle of friends of the at least first virtual clone in the virtual environment.

19. The method of claim 18, wherein the plurality of fundamental clone factors further includes:

an activity factor of the at least first virtual clone in the virtual environment, an acquired intelligence quotient of the at least first virtual clone in the virtual environment, a social quotient of the at least first virtual clone in the virtual environment, a luck quotient of the at least first virtual clone in the virtual environment, a circle of influence corresponding to the at least first virtual clone in the virtual environment, a success factor of the at least first virtual clone in the real-world events of the virtual environment, and a popularity index of the at least first virtual clone in the virtual environment.

20. The method of claim 19, wherein a corresponding fundamental clone factor among the plurality of fundamental clone factors depends on one or more sets of fundamental clone factors among the plurality of fundamental clone factors.

* * * * *